US010769679B2

(12) United States Patent
Goldstein et al.

(10) Patent No.: US 10,769,679 B2
(45) Date of Patent: Sep. 8, 2020

(54) SYSTEM AND METHOD FOR INTERACTIVE UNITS WITHIN VIRTUAL REALITY ENVIRONMENTS

(71) Applicant: CRACKLE, INC., Culver City, CA (US)

(72) Inventors: Aaron Goldstein, Los Angeles, CA (US); Christine Coner, Los Angeles, CA (US); Ihor Yaskiw, Santa Monica, CA (US)

(73) Assignee: CRACKLE, INC., Culver City, CA (US)

(*) Notice: Subject to any disclaimer, the term of this patent is extended or adjusted under 35 U.S.C. 154(b) by 231 days.

(21) Appl. No.: 15/415,077

(22) Filed: Jan. 25, 2017

(65) Prior Publication Data
US 2018/0211290 A1 Jul. 26, 2018

(51) Int. Cl.
G06Q 30/00 (2012.01)
G06Q 30/02 (2012.01)
G06F 3/01 (2006.01)
G02B 27/01 (2006.01)
H04N 21/81 (2011.01)
H04N 21/472 (2011.01)
H04N 21/4223 (2011.01)

(52) U.S. Cl.
CPC ....... *G06Q 30/0277* (2013.01); *G02B 27/017* (2013.01); *G06F 3/011* (2013.01); *G06F 3/012* (2013.01); *G06F 3/013* (2013.01); *G06Q 30/02* (2013.01); *G06Q 30/0241* (2013.01); *H04N 21/4223* (2013.01); *H04N 21/47217* (2013.01); *H04N 21/812* (2013.01); *H04N 21/8146* (2013.01)

(58) Field of Classification Search
None
See application file for complete search history.

(56) References Cited

U.S. PATENT DOCUMENTS

| 8,606,634 | B2 | 12/2013 | Porter et al. | |
| 9,996,150 | B2* | 6/2018 | Swaminathan | G06F 3/0481 |
| 10,416,760 | B2* | 9/2019 | Burns | G06T 19/006 |
| 2002/0063727 | A1 | 5/2002 | Markel | |
| 2008/0104026 | A1* | 5/2008 | Koran | G06F 17/30867 |

(Continued)

Primary Examiner — Naresh Vig
(74) Attorney, Agent, or Firm — Mayer & Williams PC

(57) ABSTRACT

Systems and methods according to present principles provide a virtual environment, particularly but not exclusively for virtual and augmented reality, with the ability to offer compelling interactive advertisements that users can choose (or not) to interact with, without being forced to watch the same. In so doing, the systems and methods provide for addressable units, termed "vessels", which are interactive and which provide the viewer with the ability to control their experience via an active selection, e.g., of advertisements. Such interactivity is provided along with the ability to enjoy a "main" item of content, in some implementations. In addition, the interactivity may be provided as part of an entertainment "hub" in which VR experiences may be launched and/or in which main content may be displayed. Thus, the system provides a new, addressable unit, such as for advertisements, for virtual content-viewing environments, hubs for the same, or other virtual environments.

21 Claims, 4 Drawing Sheets

(56) References Cited

U.S. PATENT DOCUMENTS

| | | | |
|---|---|---|---|
| 2008/0215436 A1* | 9/2008 | Roberts | G06Q 30/0207 |
| | | | 705/14.1 |
| 2011/0264536 A1 | 10/2011 | Chodroff et al. | |
| 2013/0050258 A1* | 2/2013 | Liu | G02B 27/017 |
| | | | 345/633 |
| 2015/0058102 A1 | 2/2015 | Christensen et al. | |
| 2015/0106841 A1* | 4/2015 | Wolf | H04N 21/812 |
| | | | 725/32 |
| 2016/0300392 A1* | 10/2016 | Jonczyk | G06T 19/003 |
| 2017/0053304 A1* | 2/2017 | Eskilsson | G06F 16/951 |

* cited by examiner

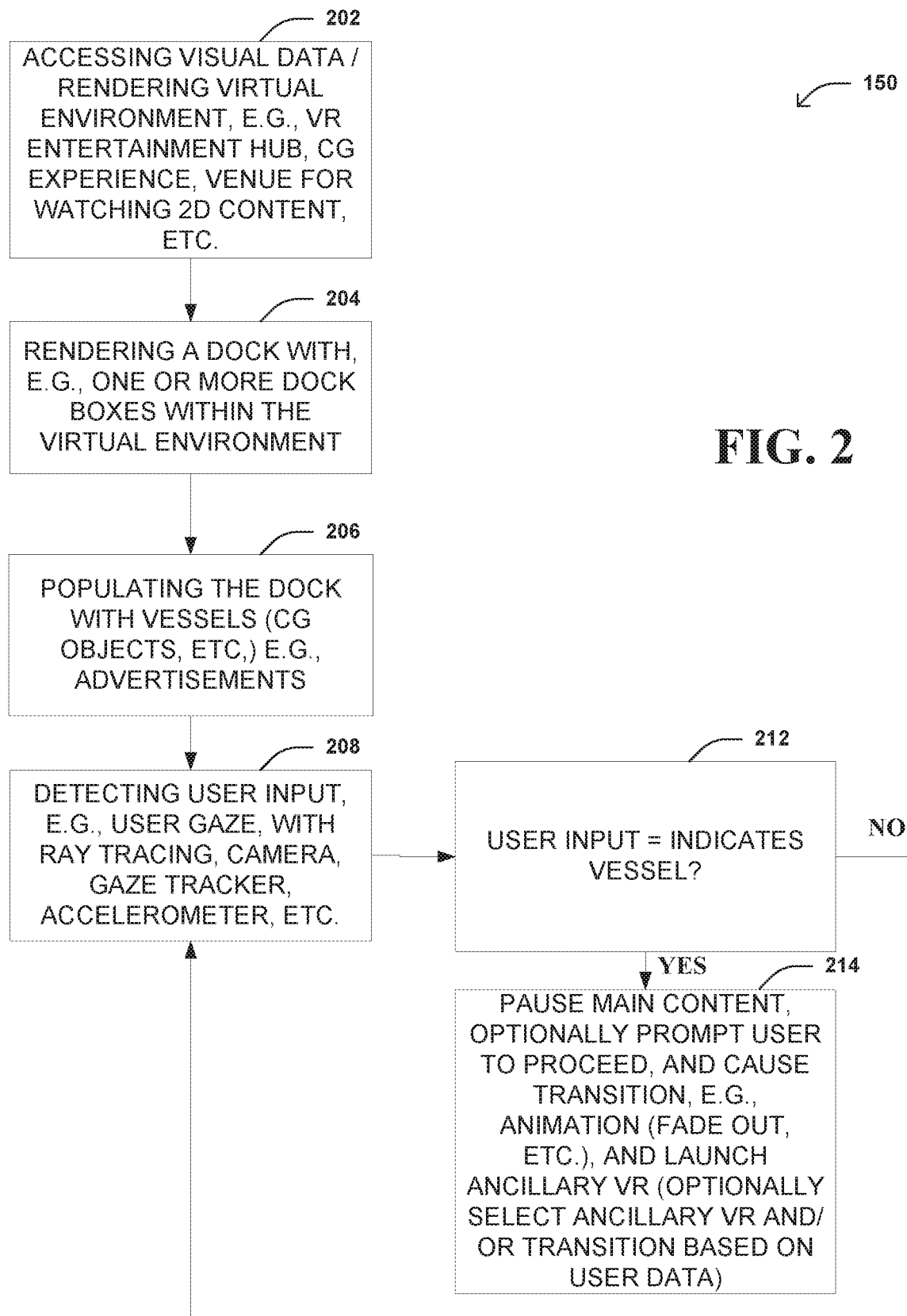

US 10,769,679 B2

SYSTEM AND METHOD FOR INTERACTIVE UNITS WITHIN VIRTUAL REALITY ENVIRONMENTS

FIELD

The invention relates to the placement and use of interactive units within virtual environments.

BACKGROUND

Over the last several years, interest in virtual reality (VR) has blossomed from a niche technology only accessible to military and other sophisticated or specialty end users to a consumer technology accessible and embraceable by any technologically sophisticated consumer. Thus, VR products have arisen from many of the major consumer electronics companies, as well as from several of the major Internet centric technology companies. Some of these products are more high-end, accessing high-powered computer equipment or gaming consoles to drive an extended VR experience, while others are more suited to short-term VR experiences and use head mounted displays (HMD) in which a smart phone may be placed to both drive and display the experience.

In either case, a virtual environment is often employed as a "hub" in which VR experiences, e.g., applications and/or so-called 360° videos, may be searched for, browsed, purchased, and experienced. In many cases, 2D content may be viewed, and the same displayed where the user appears to be watching the 2-D content on a large screen. Various environments have been employed for this purpose, including large-scale, where the user appears to be in a large theater, and even microscale, where the viewer is a tiny entity, viewing the 2-D content within a small-scale environment, e.g., the viewer is the size of an ant and is viewing a "large" screen but the same is only a few inches in size in the scale of the environment.

Multiple sources are known to serve 2-D content as well as 360° video. However, presentation of advertisement content has not changed. For example, the user may be required to watch a portion or all of an advertisement prior to viewing premium content.

Such technology does not take advantage of the unique opportunities of the VR environment, particularly with regard to its interactive nature. This aspect is particularly problematic as a VR environment is inherently interactive, as users are enabled to turn their "head" and to view the environment from any perspective. From the user's perspective, passive advertisements are a departure from the nature of this natively interactive experience.

It is noted that efforts have been made to provide advertisements within a VR environment. For 2D content, Hulu®'s VR application serves traditional video advertisements on the screen within the viewing environment. While providing the same within the context of VR, the experience is passive and generally non-engaging. In the context of 360° videos, Sky VR provides an application that launches 360° video advertisements during preassigned breaks in content, essentially serving as an advertisement server for VR. For example, advertisements, including 360° video advertisements, can be provided pre-roll, before the viewer starts an experience, or, e.g., mid-stream. However, in this application, a viewer lacks control over when and how the advertisement experience happens, as well as over the content they experience.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

In more detail, systems and methods according to present principles meet the needs of the above in several ways. In particular, present systems and methods provide a virtual environment with the ability to offer compelling interactive advertisements that users can choose (or not) to interact with, without being forced to watch the same.

In so doing, the systems and methods provide for addressable units, termed "vessels", which are interactive and which provide the viewer with the ability to control their experience via an active selection, e.g., of advertisements. Such interactivity is provided along with the ability to enjoy a "main" item of content, in some implementations. In addition, the interactivity may be provided as part of an entertainment "hub" in which VR experiences may be launched and/or in which main content may be displayed. Thus, the system provides a new, addressable unit, such as for advertisements, for virtual content-viewing environments, hubs for the same, or other virtual environments.

In one aspect, the invention is directed towards a method of delivering ancillary virtual reality content, including: accessing visual data and causing a virtual environment to be rendered in or streamed to a virtual reality display, the virtual environment including a dock having one or more dock boxes as part of the virtual environment, the dock boxes providing areas or volumes for placement of respective vessels, the vessels within the virtual environment constituting respective indicators of subject matter of associated respective ancillary virtual reality content; populating the one or more dock boxes with respective vessels; detecting user input; upon detecting user input indicating a vessel, playing back the ancillary virtual reality content associated with the vessel; and following the ancillary virtual reality content playback, accessing the visual data and resuming the rendering or streaming of the virtual environment.

Implementations of the invention may include one or more of the following. The detecting user input indicating a vessel may include detecting a user gaze and if the user gaze is directed toward a vessel for greater than a predetermined duration of time, detecting that the user input is indicating the vessel. The vessel may be a computer-generated object within the virtual environment and the user gaze may be detected to be directed toward the computer-generated object or intersecting the computer-generated object. The computer-generated object may be a planar image on a wall of the virtual environment. The computer-generated object may be an animated computer-generated model. The virtual environment may be a hub for a plurality of virtual reality experiences, a virtual reality computer-generated application, an environment for watching 2D or 360° video or image content items, and so on. The method may further include causing a transition to the ancillary virtual reality content, in which the transition includes an animation of a computer-generated object constituting the vessel. The method may further include causing a transition to the ancillary virtual reality content, in which the transition includes a fade-out of the virtual environment and a fade-in of the ancillary virtual reality content. The method may further include causing a transition to the ancillary virtual reality content, in which the causing a transition includes displaying a prompt for the user to allow or prohibit the playback of the ancillary virtual reality content. If the virtual environment includes main content that is playing when the ancillary virtual reality content is played back, then the method may further include pausing the main content during playback of the ancillary virtual reality content, and in an implementation unpausing the main content once the ancillary virtual reality content playback is over. The display may be a head mounted display, and the detecting user input may include receiving a signal from an accelerometer coupled to the head mounted display, or receiving a signal from a camera coupled to the head mounted display, or receiving a signal from a gaze tracker associated with the head mounted display. The virtual environment may be a volumetric virtual reality environment. The ancillary virtual reality content may be a virtual reality advertisement. The method may further include accessing user data of the user, and selecting the virtual reality advertisement from an advertisement database, the selecting based on the user data. The method may further include accessing user data of the user, and selecting a vessel from a vessel database, the selecting based on the user data.

In another aspect, the invention is directed towards a method of delivering ancillary virtual reality content, including: rendering or streaming a virtual environment in or to a head mounted display; rendering or streaming within the virtual environment one or more vessels, the one or more vessels displaying associated images or other textures; detecting user input; if the user input indicates a vessel, rendering or streaming ancillary virtual reality content replacing a portion or all of the virtual environment in the head mounted display, the ancillary virtual reality content including a virtual reality experience or a 360° video; and following a conclusion of the rendering or streaming of the ancillary virtual reality content, accessing visual data and resuming rendering or streaming the virtual environment.

Implementations of the invention may include one or more of the following. The one or more vessels may be arranged as part of a dock. The rendering or streaming may be associated with a user account, and the ancillary virtual reality content may be based at least in part on user data associated with the user account.

In another aspect, the invention is directed towards a method of delivering an ancillary virtual reality content playback, including: accessing visual data and causing a rendering or streaming of a virtual environment in a virtual reality display, the virtual environment including a dock defining one or more dock boxes as part of the virtual environment, the dock boxes providing areas or volumes for placement of respective vessels; accessing user data; selecting a vessel based at least in part on the accessed user data; populating a dock box with the selected vessel; detecting user input; upon detecting user input indicating a particular vessel, rendering or streaming an ancillary virtual reality content associated with the indicated vessel; and following the ancillary virtual reality content, resuming rendering or streaming the virtual environment.

Advantages of the invention may include, in certain embodiments, one or more of the following. The unit enhances the user experience in a fully-immersive viewing environment like VR, where traditional/auto-played 2D and 360° video have been shown to deter adoption. The unit increases the appeal of, e.g., advertisement inventory to digital advertisers who rely heavily on the ability to target advertisements and prove user engagement.

Systems and methods according to present principles in certain implementations provide for optimized or optimal monetization in VR. Systems and methods according to present principles, which provide, e.g., addressable advertisement units, give advertisers the ability to hold and measure the viewer's attention. The use of targeted environmental placements to encourage user-initiated 360° video advertisements allows the monetization of VR content apps, e.g., Crackle®, more quickly and effectively. Systems and methods according to present principles provide for more efficient advertisement placement, e.g., where viewers are more interactively engaged and addressable. Systems and methods according to present principles are also consistent with current user actions, e.g., the same are akin to using a cell phone while watching television, i.e., the units provide an extra degree of interactivity. Systems and methods according to present principles provide an efficient, interesting, and interactive advertisement format. Systems and methods according to present principles provide for a more efficient computing environment as users only consume, e.g., advertisements that they are interested in, conserving bandwidth, battery life, and other computing resources.

Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 2 is a flowchart of a method according to present principles.

Like reference numerals refer to like elements throughout. Elements are not to scale unless otherwise noted.

DETAILED DESCRIPTION

Systems and methods according to present principles in one implementation provide a new, addressable unit, such as for advertisements, for virtual environments, whereby a viewer may be enabled to interact with the addressable unit to increase interest with the subject matter of the unit as well as with the virtual environment overall. The unit may be part of a viewing hub where one or more VR experiences may be launched, or may be embodied by a virtual environment designed for content-viewing, such as a virtual theatre, living room, etc., where users consume movie or TV content (either 2-D or 360° video) with VR hardware. The addressable unit launches ancillary virtual reality content, which is generally 360° video content.

In one implementation, and unlike existing VR advertisement technology that only serves 2D/360° video, the unit according to present principles includes two aspects or components. First, a targeted environmental placement of units (also termed "vessels") within the viewing environment. Second, the delivering of ancillary virtual reality content such as a 360° video experience that launches upon user interaction (described below) with the correlating environmental placement.

Figures 1A, 1B, 1C:
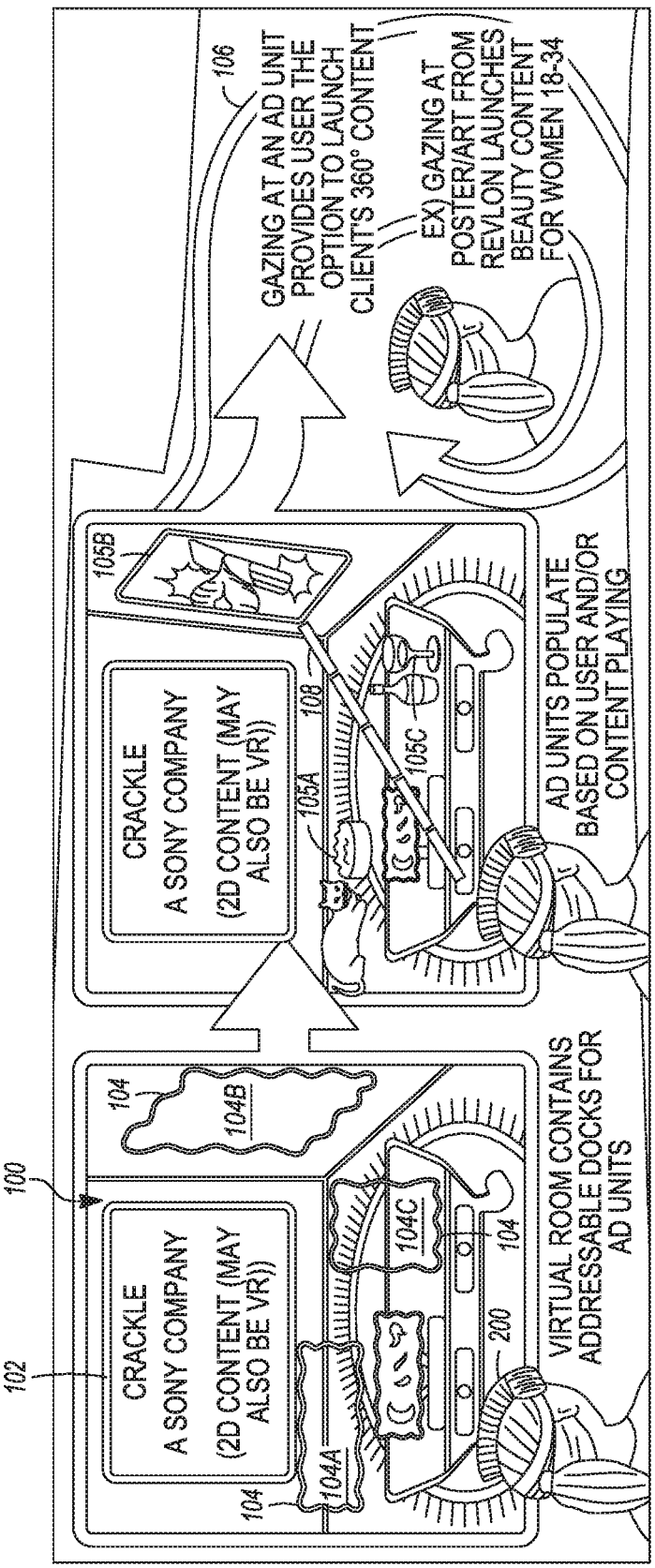
FIG. 1(A)-1(C) shows a schematic depiction of systems and methods according to an implementation.

Referring first to FIG. 1(A) and FIG. 1(B), a virtual environment 100 is provided in which a viewer or end user is immersed by way of an appropriate HMD 200, which when worn by a user may cause the user to be immersed in the virtual environment 100.

The virtual environment 100 may be a room, e.g., a theater or living room environment, or other environment, in which a main item of content 102 may be viewed and/or in which one or more VR experiences may be launched and experienced, such as VR apps or 360° videos. It will be understood that other types of environments may also be included within the definition of the virtual environment 100.

Referring in particular to FIG. 1(A), the virtual environment 100 may be configured to provide a dock 104 having one or more locations, slots, or boxes defined in which vessels may be interchangeably placed or otherwise located. For example, the virtual environment may be defined by a computer-generated (CG) model in a game engine, and the dock may be defined by one or more boxes of predefined sizes within the CG model of the virtual environment. In FIG. 1(A), the dock 104 defines one or more boxes 104a, 104b, and 104c. In some cases, the boxes may also have predefined locations within the virtual environment, but this is not necessary. For example, where the box represents a poster, the same may generally be placed on any wall. In other cases, where the box is a bounding box for a CG object, e.g., a bottle of wine, then the box may have a predefined location, e.g., on a table, as such items cannot generally be placed in any location. Thus, dock boxes may have an identifier associated with them (as metadata associated with the computer-generated model or mesh of the same) such as, e.g., "table", "wall", "floor", so as to indicate a general location, which may then be used by a vessel producer to situate an appropriate vessel. For example, where the vessel represents an advertisement, a vessel that is a CG model of a wine bottle may be placed on a table. A vessel that represents and launches ancillary virtual reality content pertaining to cat food may be a CG model of a cat, and the same may be situated on the floor of the virtual environment. A vessel that represents and launches VR content pertaining to makeup may be a CG model of a poster showing a model wearing the makeup, and the same may be situated on a wall of the virtual environment. Multiple CG models may pertain to the same ancillary virtual reality content. For example, in addition to the vessel of a poster advertising makeup, CG models of lipstick and other makeup containers may be placed on a table in front of the virtual position of the viewer.

It is generally beneficial for the sizes of the dock boxes along with their general nature (wall, floor, and so on) to be known by vessel producers so that appropriate content can be generated for the same. For example, the size of the dock box will represent and influence the number of vertices of a computer-generated model that is placed in or at the position of the dock box. Where images are included as part of a vessel, the size of the dock box will influence the resolution of the image used. For mobile environments, it may be desired to simplify the CG mesh so as to reduce the number of vertices associated with the same, to ease computational load when generating the virtual environment.

The above description is generally for the situation where the virtual environment is generated by a static CG model, e.g., of the virtual environment room. Where the virtual environment is generated by a parameterized model, or procedural model, similar considerations will apply. The same may generate the dock, e.g., one or more boxes disposed for convenient places of vessels, or the boxes may be situated after the procedural model is generated, e.g., by moving, displacing, or replacing vertices created procedurally with vertices generated expressly for purposes of the dock box. For example, a wall, generated procedurally, may be overlaid or have a portion of its vertices replaced by vertices (and textures) representing a frame, where within the frame a vessel (in the case of a frame, a poster or other planar object) is intended to be placed.

Where the viewer is consuming another item of content while in the virtual environment, e.g., where the viewer is viewing a 2-D video within the environment, the dock may only encompass certain items not on the screen displaying the 2-D content. However, in some cases, content consumed by the viewer may include CG content, e.g., where the viewer is experiencing a tour or other VR experience through a computer-generated environment. In this case, the content being consumed, i.e., the main item of content, may itself include a dock and/or vessels that the user may indicate or select, which in turn may launch the ancillary virtual reality content playback. For example, while on a virtual tour of a computer-generated model of the city, a user may pass by a branded hotel. If the viewer activates the same, e.g., by gazing at a CG model of the same for greater than a predetermined threshold of time, the viewer may be provided with a 360° video advertisement about the hotel.

In any case, by having the dock 104 in which individual dock boxes may be populated by vessels, a more turnkey layout may be provided, allowing vessel providers, e.g., advertisers, with known sizes for units. In addition, by situating the vessels in a known dock, significant computing efficiency is gained, as the system need not generate a custom computer-generated model with addressable units having customized locations—the only step needed is to switch out the vessels already there.

Vessels within the dock boxes 104a, 104b, and 104c, are shown in FIG. 1(B) as constituted by various CG elements 105a, 105b, and 105c, where these vessels constitute respective indicators of subject matter of associated respective ancillary virtual reality content. Such vessels may include, e.g., 3-D static or animated objects that reside in the virtual environment 100 and indicate the ancillary virtual reality content. For example, in FIG. 1(B), one vessel is shown as a cat with a bowl of cat food (where the vessel indicates ancillary virtual reality content of an advertisement for cat food by indicating the subject matter with a cat and a bowl of cat food), another is indicated by a bottle and glass of wine (where the vessel is a glass and a bottle indicating the subject matter of the associated respective ancillary virtual reality content, which is wine), and a third is indicated by a poster on the wall of the virtual environment.

When a viewer interacts with a vessel, an ancillary virtual reality content playback is triggered or launched. In many cases, the ancillary virtual reality content is a 360° video, a 360° image, or a VR application. The ancillary virtual reality content may include analogous counterparts of varying bit rates to account for varying devices and bandwidths.

As illustrated in addition by FIG. 1(B), the HMD 200 may detect that the user is interacting with a vessel in a number of ways, e.g., via gaze tracking. In FIG. 1(B), a ray trace 108 is illustrated indicating that the HMD 200 is interacting with the vessel 105*b*.

It will be understood that numerous ways may be employed to detect or determine that a user is indicating, selecting, activating, or otherwise interacting with a vessel. For example, a camera may detect that the user is looking at the vessel. A gaze tracker may detect that a viewer's eye is looking at the vessel. An accelerometer may be employed to determine that the orientation of a device associated with the HMD, e.g., a viewing plane, is oriented in a direction towards the vessel. An external camera, e.g., situated in the physical room in which the viewer and HMD are located, may be employed to determine that the HMD is pointed towards the vessel. Gyroscopes, magnetometers, and other sensors may also be employed for this purpose. Other ways will also be understood.

In many implementations, user indication of a vessel will be determined to meet a threshold criterion of interaction when the user has indicated the vessel for greater than a predetermined threshold amount of time. For example, if the user's gaze is detected to be on a vessel for over two or three seconds, the vessel may be determined to be "indicated" or "selected" by the viewer. Other criteria may also be employed. In at least one implementation, a user's gaze is detected to be on a vessel if the ray traced by the user's gaze intersects the CG model of the vessel.

The vessel is typically associated with the ancillary virtual reality content, although this is not a requirement. For example, the vessel may be a CG model of a cat, where the ancillary content is cat food. In the same way, the vessel may be one or more items of makeup, where the ancillary content pertains to an advertisement for makeup. It is noted in this regard that in the case of advertisements, the advertiser thus is afforded two opportunities to market to the viewer: first, the vessel itself may provide a level of brand knowledge or recognition, and second, the ancillary virtual reality content playback provides additional information about the product or service to the viewer. Interest may further be heightened as the viewer does not know which of the computer-generated elements constitutes a vessel, and thus may be tempted to gaze at several or many. In some implementations, however, activatable elements may be "called out" in a particular fashion, e.g., by sparkling or other such visual indicators.

Upon detection or determination that a viewer is indicating, activating, or selecting a vessel, i.e., interacting with the same, the ancillary virtual reality content playback (element 106 in FIG. 1(C)) may launch immediately or the same may be associated with a transition from the virtual environment to the ancillary virtual reality content playback. For example, the transition may be that the previous virtual environment, e.g., an entertainment hub or content viewing environment, fades out and the ancillary virtual reality content playback fades in. More sophisticated transitions and animations may also be employed. For example, gazing at a vessel that is a poster or art product from a makeup manufacture may launch an ancillary virtual reality content playback that is an advertisement targeted at women from ages 18-34 if the user data about the viewer indicates this demographic. In a particularly sophisticated implementation of a vessel that transitions via an animation, gazing at a computer-generated cat model may cause the CG cat to be animated so as to appear to run out of the virtual environment 100 while at the same time launching a 360° video advertisement for cat food.

In some implementations the viewer may be prompted as to whether to allow or prohibit the ancillary virtual reality content playback. For example, upon detecting that a user has interacted with a vessel, a prompt may be displayed to the viewer to ask the viewer if the ancillary virtual reality content playback should be launched, e.g., "Do you wish to learn more about this product?". The user may concur by continuing gazing at the vessel or by, e.g., indicating concurrence by activation of a button or other UI element, or by activating one or more physical buttons associated with the computing environment. If the user concurs, the ancillary experience may be launched. If the viewer does not, the viewer may be enabled to continue experiencing the room constituting the virtual environment 100.

Various technological benefits inure to the systems and methods according to present principles. For example, as the user is only exposed to ancillary virtual reality content playback of which they are interested, because they have chosen to indicate a vessel pertaining to the same in some way, bandwidth and battery life of the appertaining computing environments are thereby saved and conserved.

Vessels may be served to individual users based on targeting criteria set by the unit provider. For example, vessels that are advertisements may be targeted to users by advertisers based on known or inferred user data, e.g., including 1st party or 3rd party demographic/behavioral data. The vessels may also be selected for users based on genre or other metadata associated with a main item of content 102. In this variation, systems and methods according to present principles may access user data of the viewer, and may further select an advertisement from an advertisement database, the selection based on the user data. More generally, a vessel may be selected from a vessel database, the selecting based on the user data.

In the same way, the "dock" may have a similar layout for all viewers, or the dock may be customized to a viewer. For example, if it is known that a viewer does not enjoy seeing a large number of advertisements, a dock which fits only one vessel may be provided. On the other hand, if a viewer enjoys seeing a number of different possibilities, a dock may be provided which fits many vessels. Dock layout may even be time- and day-dependent. For example, on a weekend, when a viewer may have more time available to browse advertisements, a dock with more locations for vessels may be provided as compared to the case where the user is experiencing the virtual environment while at work or during a weekday. As noted, vessel, e.g., advertisement, selection is generally based on inventory specified for a particular viewer, e.g., may be targeted to the same.

During the playback of the ancillary virtual reality content, the main item of content, which may be, e.g., movies or television shows, may be paused while the viewer watches the 360° advertisement. The main item of content may be un-paused and resumed once the ancillary virtual reality content playback concludes.

The use of targeted environmental placements is generally much more engaging to viewers than advertisements that are simply required to be watched prior to or along with consuming main items of content. Such are generally more engaging due to their interactivity, and increase immersion because their interactive nature is more in keeping with the native interactive nature of the original VR content. Due to the additional engagement, the same encourages user initiation of 360° advertisements, which may significantly increase the monetization of VR content and applications. In addition, such addressable interactive units enhance the overall user experience in a fully-immersive viewing environment like VR, where traditional/auto-played 2D and 360° video have been shown to deter adoption. Moreover, such addressable units increase the appeal of existing advertisement inventory to digital advertisers who rely heavily on the ability to target advertisements and prove user engagement. Such systems and methods are beneficially practiced by integrating addressable units such as advertisements in a uniform manner into the VR environment to facilitate a seamless, user-initiated experience.

Referring in addition to the flowchart 150 of FIG. 2, a method according to present principles begins in a first step by accessing visual data and rendering a virtual environment (step 202) within a head mounted display. The virtual environment may be, e.g., a VR entertainment hub, a CG experience, a venue for watching 2-D or 360° video or image content, and so on.

A dock is provided within the virtual environment (step 204). The dock is configured with one or more locations, e.g., boxes, where vessels may be placed, where the locations may in some cases have a known size such that providers of vessels, i.e., addressable units, may be enabled to configure the same for placement in such locations, e.g., may be enabled to know the size thereof so as to design vessels that fit into the locations, e.g., dock boxes. The dock may simply be an arrangement of such spaces, e.g., a list of the positions and/or sizes of such spaces (or boxes) within the virtual environment, or the dock may include mesh elements between such spaces. In some cases, the dock may form a skin that fits over and/or is coupled to an existing room mesh. The dock may then be populated with vessels (step 206), e.g., advertisements, targeted to the viewer.

Viewer input is then detected (step 208). Such input may be detected by way of detecting user gaze, e.g., using ray tracing, a camera, a gaze tracker, an accelerometer, and so on. In many cases, in a virtual environment, user input may be detected by the dwelling of a reticle for more than a predetermined threshold of time, e.g., two or three seconds, on a particular vessel. In other words, if a reticle dwells on or is detected to be incident upon or to intersect a CG object (that is a vessel) for more than the predetermined threshold criterion time, then such may be determined to have been indicated or selected by the user.

Thus, in a method of providing such ancillary virtual reality content playback, a test may be employed as to whether the user input from an HMD indicates a vessel (step 212). If not, then flow may resume to step 208. If a vessel is indicated, then flow may pass to step 214. If the user input is such that a vessel is indicated, subsequent steps may include pausing a main item of content (if one is playing), prompting the viewer to allow or prohibit the ancillary virtual reality content playback, causing a transition to the ancillary virtual reality content playback, and so on.

In variations, the vessel may be a computer-generated object within the virtual environment, and the user gaze may be detected to intersect the computer-generated object.

Figure 3:
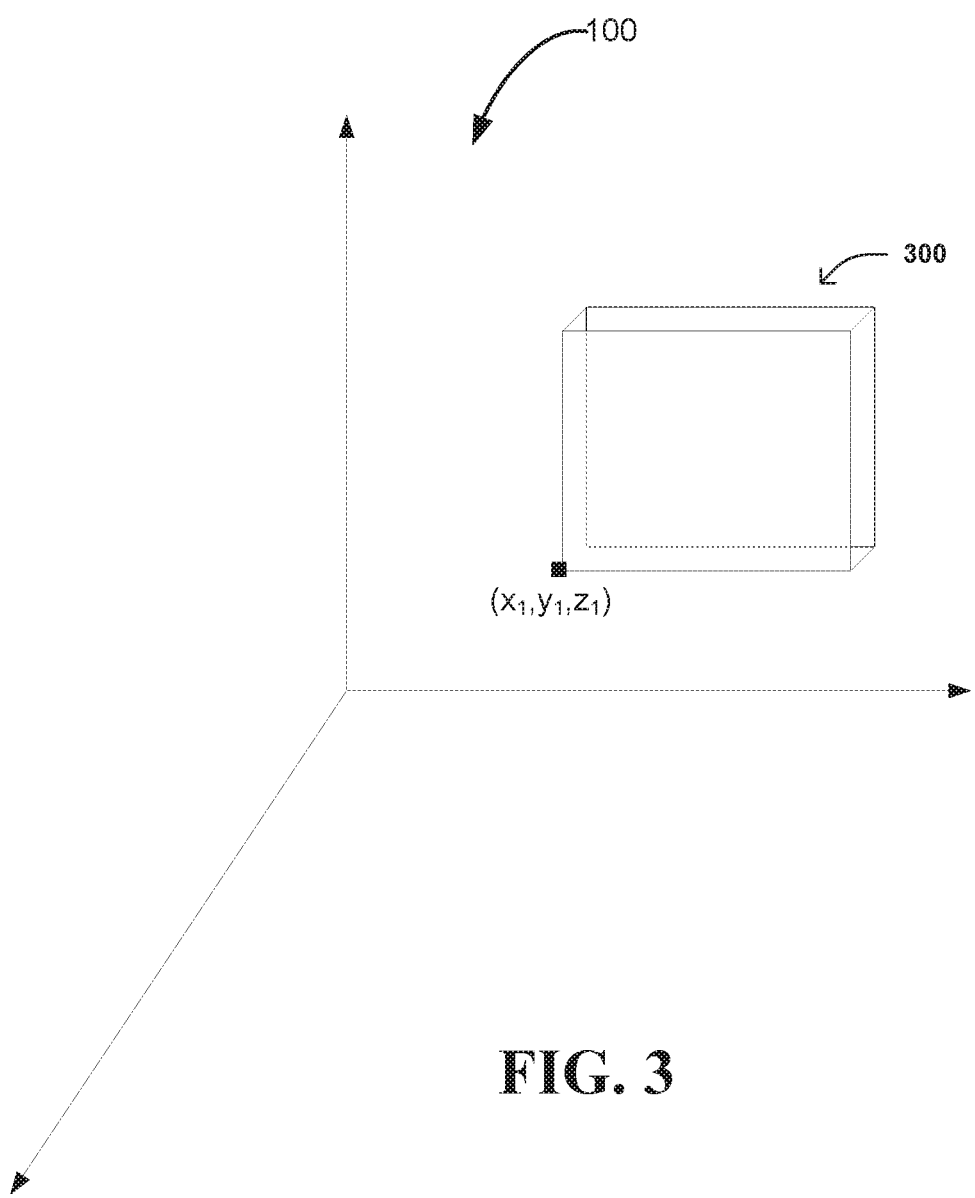
FIG. 3 is an illustration of positioning of a dock box, part of a dock, in a coordinate system of a virtual environment.

Such a computer-generated object may be a model of a three dimensional object, e.g., the aforementioned cat or wine bottle, or essentially a 2-D planar object, e.g., a poster on the wall. As noted, the virtual environment may be an entertainment hub for one or more different VR experiences, or an environment for viewing 2-D or 360° video content items. The virtual environment may also be a VR CG experience, e.g., a VR app. The only constraint is that a dock is generally provided for in the virtual environment, e.g., a layout whereby one or more vessels or other interactive units may be interchangeably placed or located at locations within the virtual environment. For example, and referring to the environment 100 of FIG. 3, an exemplary dock is shown with a dock box 300, which essentially serves as a bounding box for a CG object such as an image or other planar object. The location of the dock box may be indicated in a number of ways, including by indicating a known corner, e.g., a location $(x_1, y_1, z_1)$.

Other variations will also be understood. For example, the virtual environment may constitute a volumetric VR environment. In such an environment, the user may not only view CG objects but may also virtually "walk" around the same, including CG objects representing vessels. The interactive and ancillary virtual reality content playback may be constituted by 2-D content, 360° video or image content, a VR CG application, and so on.

Figure 4:
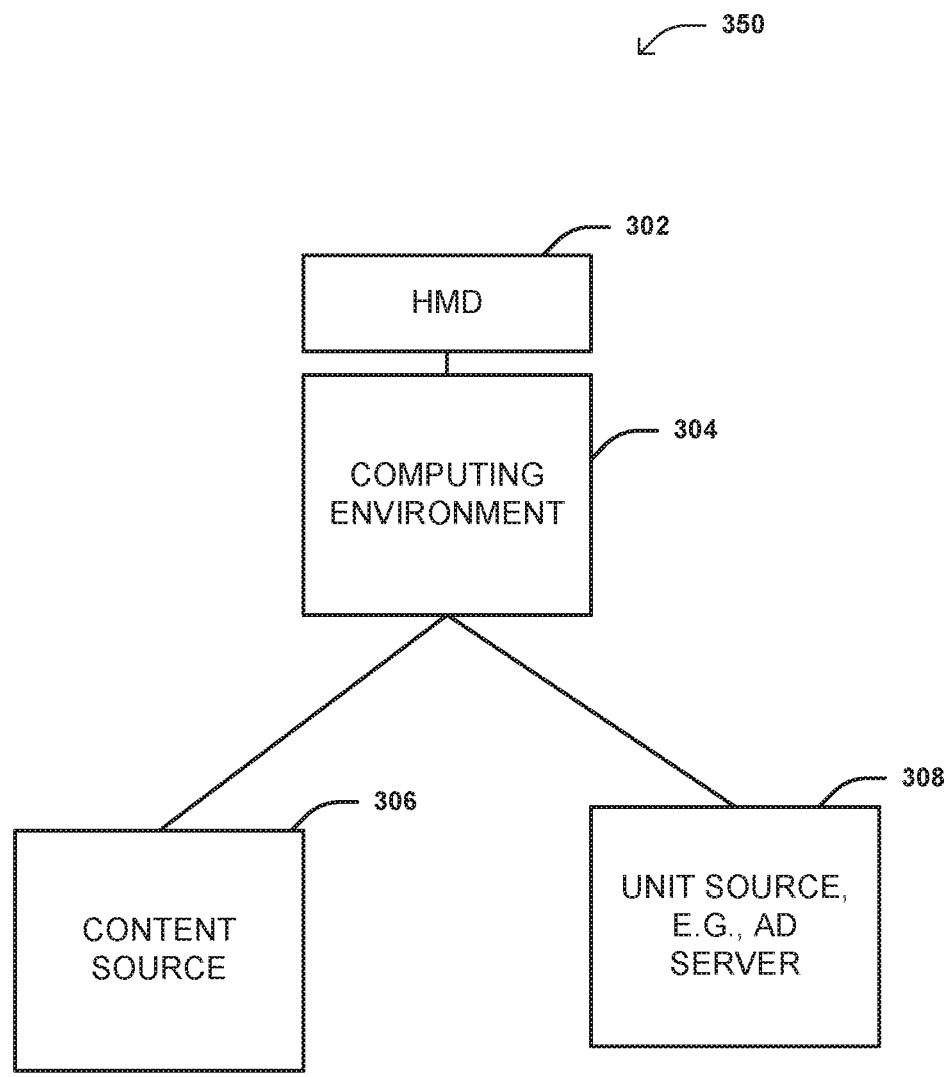
FIG. 4 is a logical diagram illustrating an exemplary arrangement of data sources for content and units used in a computing environment associated with a VR HMD, the computing environment programmed to be a specialized computing environment for interactive unit placement and utilization within a virtual environment.

In a particular implementation, and referring to the system 350 of FIG. 4, the viewer may employ an HMD 302 with an associated computing environment 304, which may be a self-contained computing environment (self-contained with the HMD) or that is coupled to a computing environment such as a laptop or desktop computer. The computing environment may run an executable file that generates a 3-D environment that is a virtual room. The virtual room may be, e.g., a theater environment that is showing a main item of content sourced from a content server 306. In addition to the theater environment, or in lieu thereof, a CG VR experience may be running (also from such a server if not stored within the computing environment 304). Within the virtual room may be a number of different vessels that are embodied by CG objects, the vessels at locations specified by a dock. The vessels may provide units such as advertisements from a unit source server 308, e.g., an ad server. The vessels may be related to the main content being displayed, or may be related to expected interests of the user, e.g., based on user data, a user profile, or user preferences, or a combination of the same.

Some of the vessels may be particularly simple, e.g., an image placed within a portion of the room, e.g., an image situated within a frame. The image may be configured such that when activated by the user, e.g., interacted with, selected, or otherwise indicated, launches an ancillary virtual reality content playback after an optional prompt for the user to confirm (prompting and confirmation may be provided for any of the vessels described, no matter the complexity). Others of the vessels may constitute static CG objects situated within the environment, e.g., a wine bottle. More complicated vessels may constitute CG objects with associated animations, e.g., a cat or dog that roams around the virtual environment. Even more complicated vessels can include animated characters configured with AI to allow significant user interactions therewith. In such cases, a viewer can ask the AI-endowed character to begin the ancillary interactive VR experience.

Generally, a viewer may interact with a vessel by having a ray trace generated from the position of the viewer's eyes to a gaze position and detecting if the ray intersects the vessel. If the ray intersects the vessel for greater than a predetermined period of time, the system can determine that the viewer has selected, activated, or otherwise indicated the vessel, instantiating the ancillary virtual reality content playback, and/or an optional transition. A reticle may also be employed to allow the viewer to indicate a gaze position.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Inputs may also be employed from an HMD, e.g., from an accelerometer or the like. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display, e.g., an HMD. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, netbook computers, handheld computers, personal digital assistants, mobile phones, smart phones, tablet computers, and also on devices specifically designed for these purpose. In one implementation, a user of a smart phone or wi-fi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the described system where main and/or ancillary virtual reality content playback is contemplated, the plural inputs may allow plural users to input relevant data at the same time.

While the invention herein disclosed is capable of obtaining the objects hereinbefore stated, it is to be understood that this disclosure is merely illustrative of the presently preferred embodiments of the invention and that no limitations are intended other than as described in the appended claims. For example, the invention can be used in a wide variety of settings, e.g., in the applications of VR content provisioning including VR movies, shows, apps, games, and so on. Systems and methods according to present principles may be employed by various types of VR HMD's, as well as content providers of VR apps and experiences. Dock layouts and vessels may be selected based on user data, user preferences, user profiles, and so on. In a multiplayer VR environment, the dock layout and vessels may be selected based on a determination as to an optimal configuration given the multiple users and the multiple sets of user data. In some cases, for a given user or users, a plurality of advertisements may be associated with a given vessel, and user data may then dictate which advertisement is selected for playback from among the plurality. For example, if it is known that a user enjoys traversing VR CG environments, and if potential vessels are available for a product to be targeted to the user, where one vessel is a VR CG environment (advertising the product) and another is a 360° video advertisement, then the VR CG environment may be selected for launch for the user. Similarly, transition types may be specified to a user if user data is known about user preferences concerning the same.

The invention claimed is:

1. A method of delivering ancillary virtual reality content, comprising:
   accessing visual data and causing a virtual environment to be rendered in or streamed to a virtual reality display, the virtual environment including a dock having one or more dock boxes as part of the virtual environment, the dock boxes providing areas or volumes for placement of respective vessels, the respective vessels within the virtual environment constituting respective indicators of subject matter of respective associated ancillary virtual reality content;
   populating the one or more dock boxes with the respective vessels;
   detecting user input by detecting a user gaze toward a vessel or detecting an orientation of the virtual reality display toward the vessel;
   upon detecting the user input indicating a vessel by detecting the user gaze toward the vessel or detecting the orientation of the virtual reality display toward the vessel, pausing the accessing visual data by stopping the rendering of the visual data and the virtual environment, and causing a transition and rendering of the ancillary virtual reality content, wherein the transition includes a fade-out of the virtual environment and a fade-in of the ancillary virtual reality content,
   playing back the ancillary virtual reality content associated with the vessel; and
   following the ancillary virtual reality content playback, accessing the visual data and resuming the rendering or streaming of the virtual environment.

2. The method of claim 1, wherein detecting user input indicating a vessel includes detecting a user gaze and if the user gaze is directed toward a vessel for greater than a predetermined duration of time, detecting that the user input is indicating the vessel.

3. The method of claim 1, wherein the vessel is a computer-generated object within the virtual environment and wherein the user gaze is detected to be directed toward the computer-generated object or intersecting the computer-generated object.

4. The method of claim 3, wherein the computer-generated object is a planar image on a wall of the virtual environment.

5. The method of claim 3, wherein the computer-generated object is an animated computer-generated model.

6. The method of claim 1, wherein the virtual environment is a hub for a plurality of virtual reality experiences.

7. The method of claim 1, wherein the virtual environment is a virtual reality computer-generated application.

8. The method of claim 1, wherein the virtual environment is an environment for watching 2D or 360° video or image content items.

9. The method of claim 1, further comprising causing a transition to the ancillary virtual reality content, wherein the transition includes an animation of a computer-generated object constituting the vessel.

10. The method of claim 1, further comprising causing a transition to the ancillary virtual reality content, wherein the causing a transition includes displaying a prompt for the user to allow or prohibit the playback of the ancillary virtual reality content.

11. The method of claim 1, wherein if the virtual environment includes main content that is playing when the ancillary virtual reality content is played back, then pausing the main content during playback of the ancillary virtual reality content.

12. The method of claim 11, further comprising unpausing the main content once the ancillary virtual reality content playback is over.

13. The method of claim 1, wherein the display is a head mounted display, and wherein the detecting user input includes receiving a signal from an accelerometer coupled to the head mounted display, or receiving a signal from a camera coupled to the head mounted display, or receiving a signal from a gaze tracker associated with the head mounted display.

14. The method of claim 1, wherein the virtual environment is a volumetric virtual reality environment.

15. The method of claim 1, wherein the ancillary virtual reality content is a virtual reality advertisement.

16. The method of claim 1, further comprising accessing user data of the user, and selecting the virtual reality advertisement from an advertisement database, the selecting based on the user data.

17. The method of claim 16, further comprising accessing user data of the user, and selecting a vessel from a vessel database, the selecting based on the user data.

18. A method of delivering ancillary virtual reality content, comprising:
rendering or streaming a virtual environment in or to a head mounted display;
rendering or streaming within the virtual environment one or more vessels, the one or more vessels displaying associated images or other textures;
detecting user input by detecting a user gaze toward a vessel or detecting an orientation of the virtual reality display toward the vessel;
if the user input, detected by detecting a user gaze toward a vessel or detecting an orientation of the virtual reality display toward the vessel, indicates a vessel, stopping playback of and replacing all of the virtual environment in the head mounted display, the replacing including rendering or streaming ancillary virtual reality content, the ancillary virtual reality content including a virtual reality experience or a 360° video; and
following a conclusion of the rendering or streaming of the ancillary virtual reality content, resuming rendering or streaming the virtual environment.

19. The method of claim 18, wherein the one or more vessels are arranged as part of a dock.

20. The method of claim 18, wherein the rendering or streaming is associated with a user account, and wherein the ancillary virtual reality content is based at least in part on user data associated with the user account.

21. A method of delivering ancillary virtual reality content, comprising:
accessing visual data and causing a rendering or streaming of a virtual environment in a virtual reality display, the virtual environment including a dock defining one or more dock boxes as part of the virtual environment, the dock boxes providing areas or volumes for placement of respective vessels;
accessing user data;
selecting a vessel based at least in part on the accessed user data;
populating a dock box with the selected vessel;
detecting user input by detecting a user gaze toward a vessel or detecting an orientation of the virtual reality display toward the vessel;
upon detecting user input indicating a particular vessel by detecting the user gaze toward the vessel or detecting the orientation of the virtual reality display toward the vessel, rendering or streaming an ancillary virtual reality content associated with the indicated vessel, the ancillary virtual reality content stopping and replacing the rendered or streamed virtual environment; and
following the rendering or streaming of the ancillary virtual reality content, resuming rendering or streaming the virtual environment.

* * * * *